United States Patent [19]

Engelke et al.

[11] Patent Number: 5,517,548

[45] Date of Patent: May 14, 1996

[54] TELECOMMUNICATION DEVICE OPERATING UNDER AN ENHANCED TDD PROTOCOL

[76] Inventors: Robert M. Engelke, 3002 Bryn Wood Dr., Madison, Wis. 53716; Kevin Colwell, 1411 Willow Trail, Middleton, Wis. 53562; Ronald W. Schultz, 950 Sauk Ridge Trail, Madison, Wis. 53717; Jeffrey Hilliard, 1521 Speedway Rd., Verona, Wis. 53593; Troy Vitek, 1929 LaSierra Way, Madison, Wis. 53716

[21] Appl. No.: 155,061

[22] Filed: Nov. 19, 1993

Related U.S. Application Data

[63] Continuation-in-part of Ser. No. 886,552, May 20, 1992, abandoned.

[51] Int. Cl.$^6$ ................................................. H04M 11/00
[52] U.S. Cl. ................................................. 379/52; 379/98
[58] Field of Search ........................... 379/52–54, 90, 379/93, 96–99, 110, 108; 340/825.19; 370/31, 24, 110.1; 375/8, 9, 91, 107, 114, 116, 121

[56] References Cited

U.S. PATENT DOCUMENTS 3,507,997  4/1970  Weitbrecht et al. ..................... 379/108
3,896,267  7/1975  Sachs et al. ............................. 379/52
4,959,847  9/1990  Engelke et al. ......................... 379/98
5,091,906  2/1992  Reed et al. .............................. 370/31
5,121,421  6/1992  Alheim .................................... 379/52
5,134,633  7/1992  Werner .................................... 375/38

FOREIGN PATENT DOCUMENTS 2749923  5/1979  Germany ................................. 379/52

Primary Examiner—Wing F. Chan

[57] ABSTRACT

A telecommunication device for the deaf is designed to operate under an enhanced TDD communication protocol. The TDD is capable of communicating with conventional TDDs operating under normal Baudot/Weitbrecht communications, but is also capable of communicating with a similarly enhanced TDD utilizing an enhanced protocol with a faster data transfer rate. The enhanced TDD is capable of signaling to another remote TDD through the use of a synchronization character that it is capable of enhanced TDD communications. If a similar synchronization character is received from the remote station, both TDDs can then switch to enhanced TDD communication with its advantages of speed and enlarged character set. The synchronization character is especially designed so as not to interfere with the operation of a conventional TDD which might receive the character and also to be sufficiently distinctive so as to be capable of definite reception by enhanced TDD machines with minimum error.

12 Claims, 4 Drawing Sheets

TELECOMMUNICATION DEVICE OPERATING UNDER AN ENHANCED TDD PROTOCOL

This application is a continuation-in-part of U.S. application No. 07/886,552 entitled: TELECOMMUNICATION DEVICE OPERATING UNDER AN ENHANCED TDD PROTOCOL filed May 20, 1992.

FIELD OF THE INVENTION

The present invention relates to the general field of telecommunication devices for the deaf (TDDs), and in particular, relates to a telecommunication device which operates under a new enhanced TDD protocol.

BACKGROUND OF THE INVENTION

Persons who are deaf or hearing impaired enough not to be able to use the telephone commonly make use of communication terminals specifically constructed and designed to enable such persons to converse over telephone lines. Such devices are referred to as telecommunication devices for the deaf or TDDs. Typically, TDDs include a keyboard and a display connected to the telephone through a modem (modulator/demodulator). The modem is built into the TDD and either directly connected to a telephone line or coupled by an acoustic coupler to a normal telephone handset. TDDs are normally capable of transmitting information over telephone lines by means of coded tones to other TDDs connected at the opposite end of the telephone line through another modem.

The code and protocol which is in widespread conventional use for TDD communication is an idiosyncratic one. The code set, known as Baudot, and the communication protocol, referred to here as Baudot/Weitbrecht, evolved historically at a time when many telecommunication devices for the deaf were based on mechanical or electromechanical devices rather than current electronic devices. Accordingly, the protocol was constructed for a set of constraints which no longer are relevant to present day devices. As it happens, those constraints worked to create a code protocol, and a telecommunication network of users and devices operating under that protocol, which is now perceived to have certain deficiencies.

One deficiency is simply speed. Conventional Baudot/Weitbrecht communication is conducted at 45.5 baud (or in some countries 50 baud). The normal Baudot character set consists of 5 bit characters. Under conventional Baudot/Weitbrecht communication, there is a start bit (one space or 0 bit), a 5 bit character, and at least 1 ½ stop bits (a mark or a 1 bit). The result is that operating under the protocol, it is possible to transmit only 6 characters per second. As it happens, many adept typists among TDD communicators are readily able to type at rates significantly in excess of 6 characters per second. While modern microprocessor-based TDDs are capable of buffering such adept typists, the result is that the transfer of communication from one TDD terminal to another can, at times, be significantly delayed behind a fast typist. This has been a source of frustration to users in the TDD community for some time.

Another difficulty with conventional TDDs operating under Baudot/Weitbrecht protocols has to do with the fact that communication is defined to be simplex, meaning that only one station is capable of communicating at any one time. Since both transmitting and receiving stations utilize the same signals (1400 hertz for a mark and 1800 hertz for a space) on the telephone line, both stations cannot send data at the same time and also receive data. There is no provision for avoiding such collisions in the conventional Baudot/Weitbrecht protocol. Instead, prior machines are simply designed to prioritize data sending. The devices will transmit a character if a key is pressed, and if the device is sending, no attempt is made to receive data.

Nevertheless, there is a large installed base of TDDs in use in many parts of the world, including the United States. If a new protocol is intended to be implemented within the existing network of TDD users, it advantageously should be compatible with the network of existing TDDs and TDD-compatible devices. In other words, even if a terminal is capable of operating with an enhanced TDD protocol permitting pseudo-duplex capability and higher speed, a terminal must also be capable of communicating with conventional Baudot/Weitbrecht TDD terminals which have neither of those capabilities.

Finally, any protocol intended for use principally with TDD networks should advantageously be designed for conversation-like communication between people. Some communication protocols notably the American Standard Code for Information Interchange (ASCII), are specifically intended and designed to permit communications between automated devices, such as computers. However, in considering optimum protocols for TDD communications, a different set of constraints is appropriate. It is also highly desirable that all code selection be automatic, i.e., that the user not be required to set any communication protocols in order to communicate with another similarly equipped user. If a device is capable of operating at an enhanced rate of speed, or with an enhanced character set, it should switch into such operation without need for action or instructions by the user. To the extent the enhanced TDD protocol is capable of making the user's interaction with another user more akin to normal human conversation, the more the device will be appreciated and utilized in the field. Also, since there are a large number of TDDs in use in the community, to the extent that a system for enhancing communication capability can be designed which can be retrofit into existing TDDs, this will facilitate the introduction and availability of this technology to a more wide spread audience.

SUMMARY OF THE INVENTION

The present invention is summarized in that a telecommunication device for the deaf is constructed which is capable of operating an enhanced TDD protocol, the terminal commencing operation at the initiation of communication sequence by first transmitting to the remote terminal a synchronization sequence which was designed to be invisible under conventional Baudot protocols yet, if recognized by the receiving machine, will result in a handshake so that both machines can switch to the enhanced TDD protocol, thereby facilitating communications between the two terminals, or, if not so recognized, communications in a standard TDD protocol.

It is an object of the present invention to define an entirely new and enhanced set of protocols for TDD communications so as to greatly facilitate communications for the deaf and the hearing impaired, and to make their communications more analogous to audible human conversations.

It is another object of the present invention to define an enhanced TDD and protocol for its use which makes little or no hardware changes to present TDDs, and this makes it possible to easily re-fit existing TDDs to the new enhanced protocol.

It is an object of the present invention to design enhanced protocol for TDD operations which is efficient, swift, and implemented in such a way so as to maximize its ability to be retrofit into existing. TDDs.

It is a further object of the present invention to enable TDDs operating under the enhanced TDD protocol to be able to support pseudo-duplex communication, so that both users can type simultaneously to the other, while data is transmitted without loss of characters by either station.

It is yet another object of the present invention to enable TDD communications to be conducted at higher speed, thereby permitting telephone charges to be lessened.

Other objects, advantages, and features of the present invention will become apparent from the following specification when taken in conjunction with the accompanying drawings.

DESCRIPTION OF THE INVENTION

The present invention envisions nothing less than an entirely new protocol for communication between telecommunication devices for the deaf. Such devices have operated for many years on a protocol, referred to herein as standard Baudot, or Baudot/Weitbrecht, whose idiosyncrasies can only be explained by historical evolution. What is envisioned here is a substantially new and enhanced protocol for communication for TDDs, that form being referred to here as the enhanced TDD protocol. As will be seen, a properly constructed TDD capable of enhanced TDD communication offers significant advantages for communicating with other similarly equipped TDDs. Nevertheless, a properly designed enhanced TDD device will also be fully capable of communicating with prior conventional TDDs using standard Baudot/Weitbrecht communication protocols.

It is a feature of the enhanced TDD communication protocol described herein that pseudo-duplex communication is possible. Using such pseudo-duplex techniques, communicating TDD terminals can, at least as perceived by the human users, transmit data to each other simultaneously without loss of characters. In fact, what happens at the machine level is that each device buffers the data received from its user, and the two devices time-share transmission over the telephone line connecting the two devices. In essence, each device in the communication link transmits a few characters, then pauses while the other station transmits a few characters in return. The system of pseudo-duplex communication is implemented by two simple rules. The first rule is that an enhanced TDD device is constrained in its operation so as to be incapable of transmitting data out on the telephone line when data is being received over that same line. The second rule is that the enhanced TDD device is constrained so that it must create a pause in the telephone communication line after a pre-selected number of characters have been transmitted. The pause is presented for the purpose of allowing the other station to transmit. As long as both stations obey these two rules, each will take its turn transmitting the pre-defined number of characters, after which the other station will gain control of the line and transmit its string of characters in return. Given the speed of enhanced TDD protocol, as described below, this communication link will appear to the users as simultaneous, even though the machines are actually time-sharing transmission and control of the communication link.

Note that the first of these rules represents a complete reversal of the protocol of operating conventional TDDs. All prior TDDs have prioritized transmission over reception. If a key was pressed, the TDD transmitted the character over the line and, since transmission would make reception difficult or impossible, no attempt at data reception is made during transmission. The enhanced TDD device reverses this priority by constraining the device not to transmit while data is being received.

Figure 1:
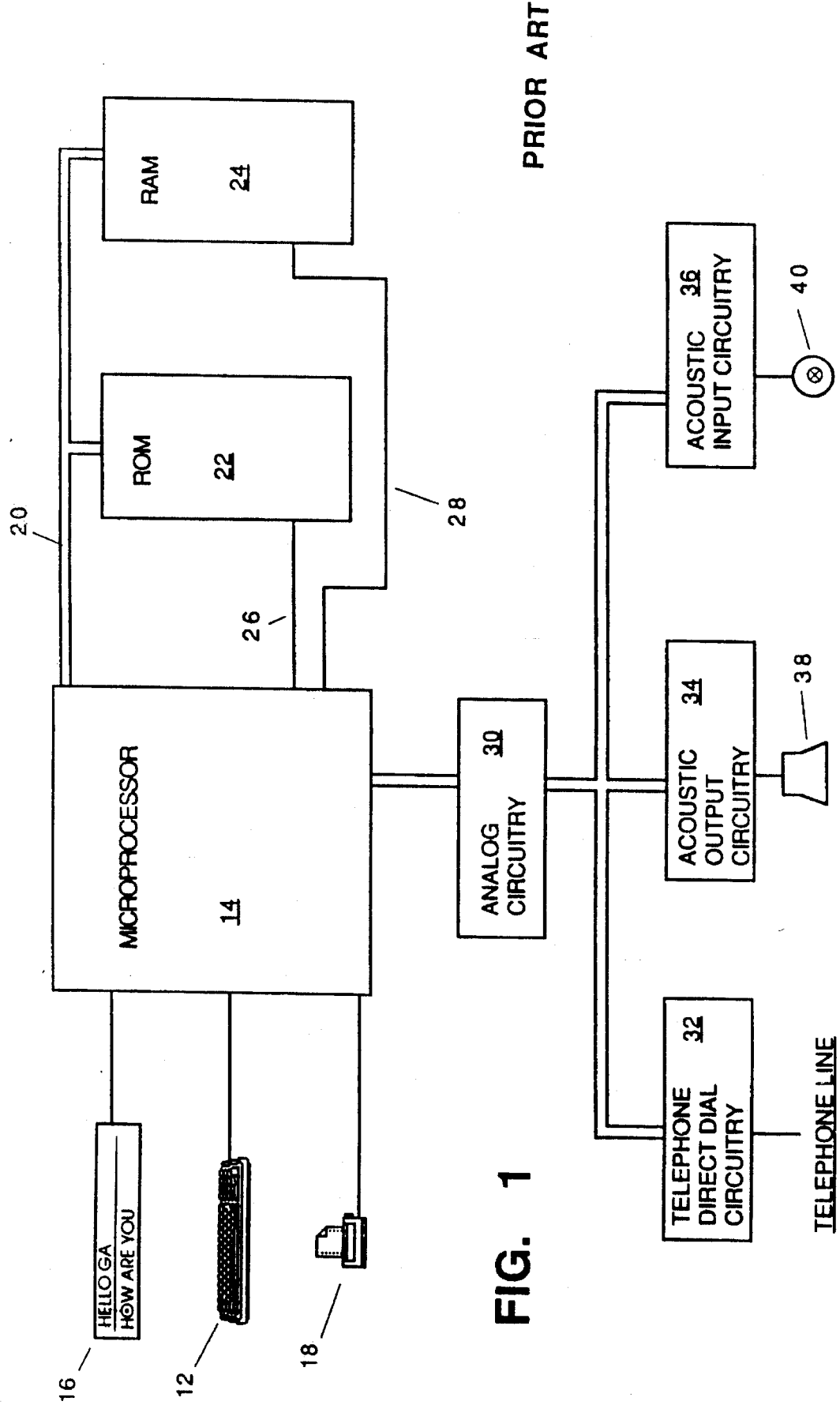
FIG. 1 is a schematic diagram of prior art TDD hardware suitable for use with the present invention.

In order to understand the functioning of the method of operation of the TDD of the present invention, it is necessary to review the structure of a typical TDD. Shown in FIG. 1 is a schematic block diagram of the circuitry of a typical TDD, either a standard or enhanced TDD operating in accordance with the present invention. In the TDD of FIG. 1, a keyboard 12 is provided onto which the user may input data characters. The output of the keyboard 12 is connected to a microprocessor 14, which serves to control the remaining circuit elements contained within FIG. 1. Characters which are received, or transmitted, by the microprocessor are also displayed to the user on a visual display 16. Optionally, the same characters received or transmitted can be printed by a hard copy printer, indicated at 18. Some TDDs may not have a printer, though all will have a visually readable display of some kind, so that the user can see the characters being typed and received. The keyboard 12 thus functions as an input source of data characters to the microprocessor 14 while either or both of the display 16 and the printer 18 serve as local destinations for the data stream of characters. The microprocessor 14 is connected by a suitable data and address bus 20, of the sort well known to those of ordinary skill in the art, which connects to a read only memory (ROM) 22 and a random access memory (RAM) 24. Appropriate control lines 26 and 28 are connected from the microprocessor 14 to the ROM 22 and the RAM 24, so as to control the operation thereof. The ROM 22 is intended to permanently house, in non-volatile storage the program which dictates the operation of the microprocessor 14. The RAM 24 is utilized as the buffer, the floating storage place for data coming into or out of the device. Rather than being on separate integrated circuits, if desired the microprocessor 14 and the ROM 22 and RAM 24 may all be combined in a single integrated circuit.

As an additional output, the microprocessor 14 is connected through analog circuitry to three separate interfaces. One output of the analog circuitry 30 which is possible is a telephone direct connect circuit 32, which is intended to directly connect by hardwiring the analog circuit 30 to a telephone line. This is the hard-wire option for wiring a TDD through its analog circuitry (a modem) into a telephone line. The other two outputs from the analog circuitry 30 are intended to operate jointly. One of these outputs in the analog circuitry is an acoustic output circuit 34, which drives a speaker 38 intended to transmit to a microphone in a telephone handset. Similarly, an acoustic input circuit 36 receives signal from a microphone 40 which is intended to sense sound from a speaker in a telephone handset. The acoustic output and receiver devices are commonly referred to as "acoustic couplers," and are intended to pass along analog signals from an electronic instrument into a conventional telephone handset, and then through the telephone line.

Figure 2:
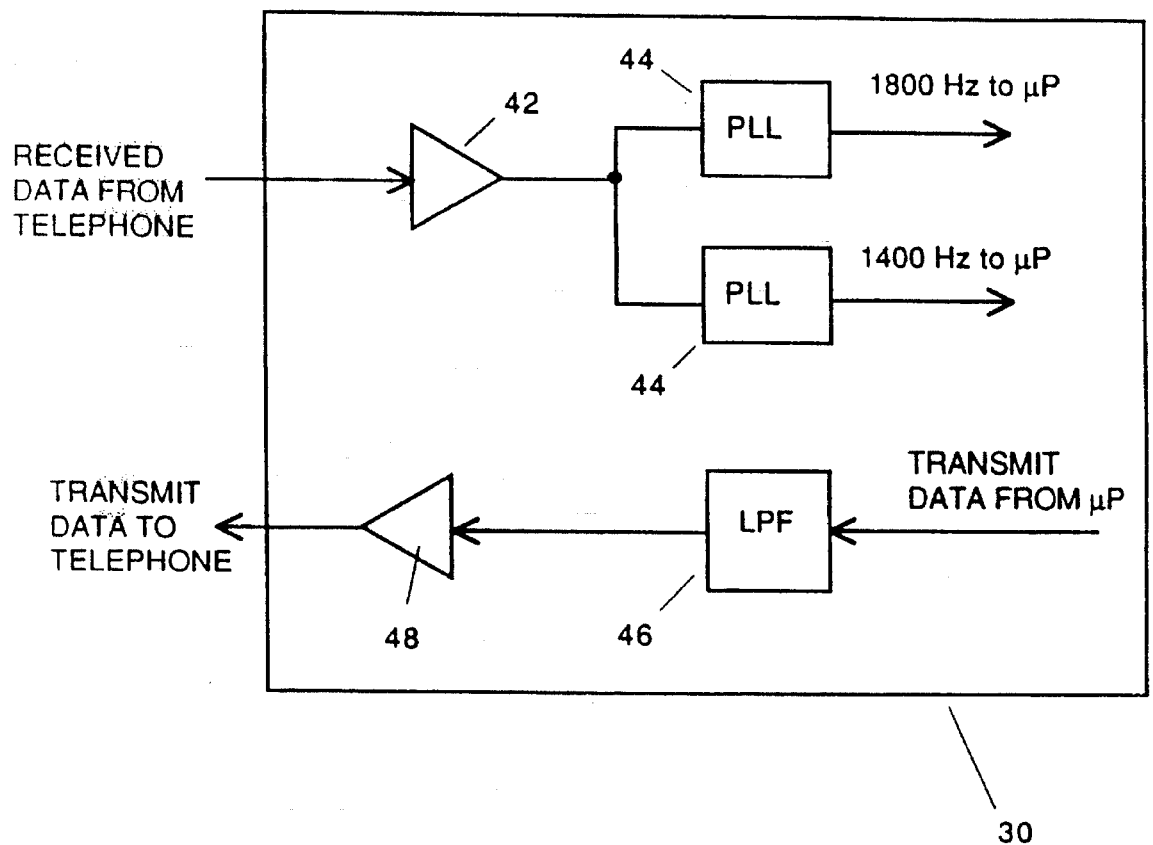
FIG. 2 illustrates schematic details of the prior art analog circuit of FIG. 1.

Shown in FIG. 2 is a simplified schematic of one implementation of the input and outputs of the analog circuitry. For data coming into the terminal, the audible input from a microphone or telephone is translated into electronic components and then presented to an amplifier 42. The output of the amplifier is presented to two phase-locked loops 44. One of the phase-locked loops 44 is tuned to a frequency of 1800 Hertz, while the other phase-locked loop 44 is tuned to a frequency of 1400 Hertz. 1800 Hertz and 1400 Hertz are the designated carrier frequencies for standard Baudot communication. On the output side of the circuitry, output signals are presented to a LPF (low pass filter) transmit wave shaping circuit 46. The output of that circuit, consisting of alternate 1400 and 1800 Hertz signals, is presented to an amplifier 48 which is hardwired to the speaker or telephone line.

In essence, devices designed generally similar to FIG. 1 are sold by several companies at present. The improvements described below will be principally to the method of operation of such a terminal, as controlled by the code which operates the microprocessor 14. In other words, the enhanced TDD terminal will have hardware largely similar to that of a conventional Baudot TDD, but will operate in a different manner both in its timing and code utilization.

Enhanced TDD Protocol

The enhanced TDD device operating in accordance with the present invention is capable of operating at normal 45.5 Baud (or 50 baud) when communicating with a conventional TDD. However, the enhanced TDD protocol TDD is also capable of operating in a second protocol, referred to here as enhanced TDD. The enhanced TDD protocol is based on frequency shift keying encoding and an average, though variable, transmission rate of just over 100 Baud. The signals for logical 1 and logical 0 are just as they are in standard Baudot, i.e. 1400 hertz for a mark and 1800 hertz for a space. However, this protocol is unusual in that, for reasons described below, the time for a space bit and the time for a mark bit are defined to be different (12 milliseconds versus 7 milliseconds). Moreover, the enhanced TDD character set consists of a 7-bit 128-character table such as the ASCII or CCITT character tables. The enhanced TDD character data signal consists of a start bit, the 7 character bits, no parity bit, and two stop bits. The start bit is a space, and the stop bits are marks. Enhanced TDD, like conventional Baudot, operates in a simplex mode, although the details of operation of the simplex communication protocol, as described below, result in a pseudo-duplex capability as perceived by the users. Thus the enhanced TDD protocol described herein utilizes the 1400 and 1800 Hertz tone generation and tone recognition circuitry already present in most TDDs and combines that with 7-bit character set, a uniquely defined baud rate with unequal bit times, and a unique handshake routine. The protocol implementation is intended to be automatic and not to require settings or other intervention by the user.

In essence, the enhanced TDD device operates to initially query the device on the other end to determine whether the remote TDD is also capable of enhanced TDD protocol communications. The enhanced TDD device presents this inquiry by sending a special synchronization sequence to the other TDD termed an "O-SYNCH" sequence. The O-SYNCH sequence is intended to be incomprehensible, or undetectable, by a conventional Baudot TDD. If an enhanced TDD device sends the O-SYNCH sequence, and receives the correct response, preferably an "A-SYNCH" sequence sent in return, then both machines can communicate in enhanced TDD protocol. If the enhanced TDD terminal fails to receive the proper synchronization sequence from the remote unit, it assumes that the remote unit is operating in conventional Baudot, and continues to communicate using conventional Baudot protocols.

When the enhanced TDD terminal does begin communicating in the enhanced TDD protocol, it re-confirms the switch to enhanced TDD by preceding its first character of transmission with non-printing preamble signal. The purpose of the preamble signal is simply to confirm to the remote terminal that both stations have received the synchronization signal and are switching to enhanced TDD. The A-SYNCH sequence may also be used as this preamble signal.

It may also be desirable that, if there is a pause in the communication, that the TDDs operating under the protocol re-synchronize. This may be done by a new synchronization handshake. Thus the synchronization sequence may be sent just at the beginning of the entire communication session, but it may be preferred in some circumstances that the sequence be sent after each pause on the line or at predefined intervals.

Many current TDDs utilize phase-locked loops to monitor incoming TDD tones. Since existing devices were designed to operate at 45.5 baud, the phase-locked loops were selected for that transmission rate. One widely used design includes phase-locked loops, such as indicated at 44 in FIG. 2, which may require as long as 2 to 10 milliseconds to "lock" on an incoming frequency. At a flat 100 baud, this may leave as little as 3 milliseconds of recognizable signal (10 milliseconds minus 7 milliseconds). To add to the reliability for enhanced TDD protocol machines, this protocol defines the bit time of one polarity (space) to be longer than the other (mark), i.e. 12 milliseconds compared to 7 milliseconds, to be sure that the receiving station can reliably detect at least one bit polarity. The receiving station need not actually detect the bits of the other polarity (mark), but can calculate the time period of the mark bits by noting the absence of the space bit tone and dividing the elapsed time period by the assigned bit time for mark bits (7 msecs) to determine the number of successive marks which were sent.

Such single channel decoding is sometimes considered undesirable due to the possibility of detecting noise bursts in the decoded channel as characters. This can be avoided, if it becomes a problem, by requiring two mark stop bits, which then form a signal long enough to be recognized by the 1400 Hz phase-locked loop. Lack of a properly defined stop bit indicates noise. The use of two stop bits ensures that the 1400 Hz signal is maintained long enough (14 milliseconds) for the 1400 Hz phase-locked loop to actuate. Normal communications does not require two such stop bits.

Figure 3:
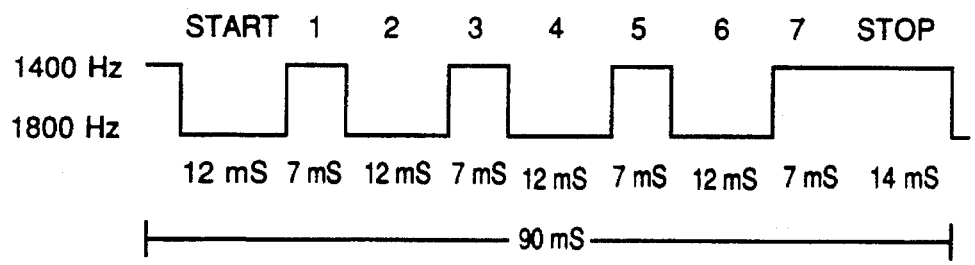
FIG. 3 is a timing diagram for an average length character, the shortest length character, and the longest length character, as transmitted under an embodiment of the present invention.
Figure 3:
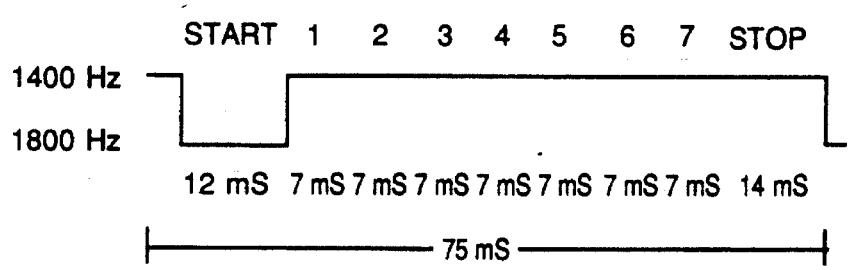
Figure 3:
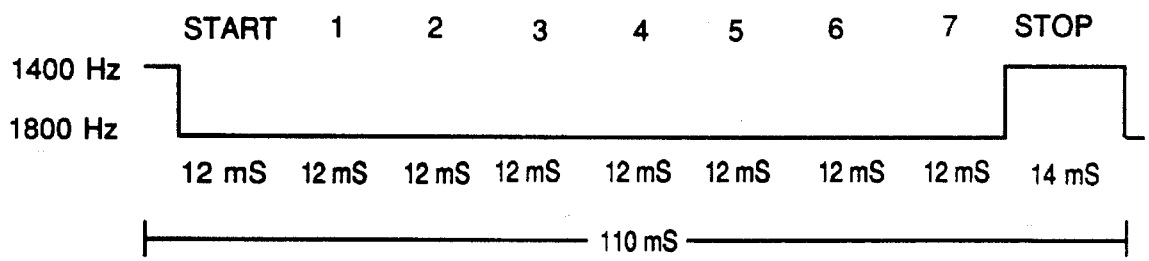

The use of such differential bit times achieves the compromise of achieving an overall average data transfer rate exceeding 100 baud while adapting to the limitations of existing hardware. It is an interesting side effect in that the length of time to transmit the various characters will vary. The longest character, the "null" character of 7 spaces would require 110 milliseconds (1 12 msec start; 7×12 msec character; 2×7 msec stop), while the shortest would be 75 milliseconds. The average character would be 90 milliseconds. This then turns out to be, on average, a faster effective data transfer rate than simple 100 baud. The variable transmission times of various characters is illustrated in FIG. 3. The top line of FIG. 3 illustrates a timing diagram for the average length character, i.e. one with three spaces of 12 milliseconds (12 mS in FIG. 3) and four marks of 7 milliseconds each. The total character length is 90 milliseconds. In the middle line of FIG. 3, the shortest character, one consisting of seven marks of 7 milliseconds each, is similarly illustrated. The bottom line of FIG. 3 illustrates the timing for the longest character, i.e. one with 7 spaces of 12 milliseconds each.

The synchronization sequence of the O-SYNCH sequence and the A-SYNCH sequence (and the preamble) for the enhanced TDD protocol must also be idiosyncratic. They should be sequences which will not be recognized as a display character by a conventional TDD, but which can easily be recognized by an enhanced TDD. This is done, in part, by defining the synchronization signals to include recognizable tone only for mark (1400 Hz) bits and to include no space bits (1800 Hz). Since conventional Baudot/Weitbrecht characters are defined to begin with a space bit, the absence of a space bit means that the enhanced TDD synchronization sequences will never be recognized by a conventional TDD. To minimize error, when a mark (1400 Hz) tone is not being sent, an echo suppression tone is applied. The echo suppression tone can be any convenient tone signal outside of the range of the phase-locked loops and within the bandwidth of the telephone line, and it has the dual function of suppressing echoes which might otherwise occur in the telephone network and of imposing a tone which will ensure that the phase-locked loops will unlock. An exemplary echo suppression tone frequency could be 1150 Hz. This tone could, since it is not detected, vary from machine to machine.

Figure 4:
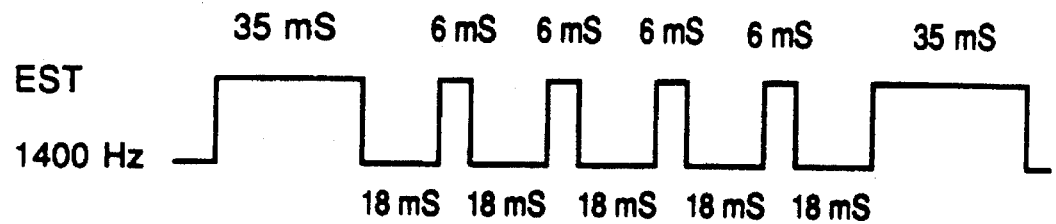
FIG. 4 illustrates a timing diagram of the O-Synch synchronization pulse utilized in the present invention.
Figure 5:
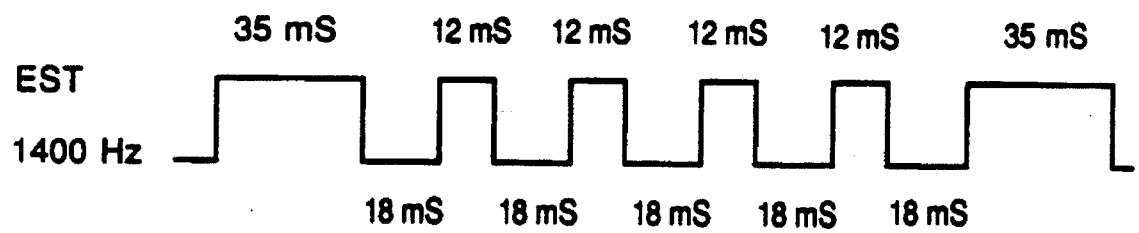
FIG. 5 illustrates a timing diagram of the A-Synch synchronization pulse utilized in the present invention.

Shown in FIGS. 4 and 5 respectively are timing diagrams of the O-SYNCH sequence and the A-SYNCH sequence for enhanced TDD communication. In essence, the synchronization characters are special code signals specifically created for the purpose of serving as synchronization signals.

In order that the synchronization sequences not be received as a printed or displayed character by conventional Baudot TDDs, they have specific features to accomplish that objective. First, note that the synchronization signals are all ones (1400 Hz) and echo suppression tones, with no space (1800 Hz) tones at all. The bit times vary in length. The synchronization sequence begins with an echo suppression tone (EST) of neither 1400 nor 1800 Hz for 35 milliseconds, which is sufficient to suppress echoes or transients on the line and unlock both the 1400 and 1800 Hertz phase-locked loops. Then there are five 18 millisecond mark (1400 Hz) tones each followed by a 6 millisecond echo suppression tone for the O-SYNCH sequence or a 12 millisecond echo suppression tone for the A-SYNCH sequence. Thus the sequence includes a specific progression which can be recognized by the receiving station and which is very unlikely to be mistaken for a display character. The TDDs may distinguish between the O-SYNCH sequence and the A-SYNCH sequence simply by timing the separation between marks. The two character types provide additional assurance against the inadvertent switching of the TDDs into the enhanced protocol. The A-SYNCH is also used as the preamble, as discussed above.

Under conventional Baudot protocol, a space bit is required to recognize a valid character by TDDs. Conventional Baudot protocol requires that there be a start bit, which is a logical 0, as the first bit time of a valid character transmission. Thus, conventional TDDs will reject the synchronization sequence as an invalid Baudot character simply on that basis. From this discussion, it should be apparent that the transmission of a single synchronization character by an enhanced TDD device will not result in any disruption or confusion if received by conventional prior art TDD.

The enhanced TDD terminal, which is capable of over 100 Baud operation, would be programmed to recognize the transmission of the O-SYNCH sequence. Upon receipt of the O-SYNCH sequence, the enhanced TDD would reply with the A-SYNCH sequence to establish that they are both capable of enhanced Baudot communications. The originating TDD would then preface the first character sent in the enhanced mode with yet another A-SYNCH sequence, i.e. the preamble, to confirm receipt of the first A-SYNCH response. This latter preamble sequence is "loosely" decoded by the receiving TDD which simply checks for any two pulse edges separated by 30 milliseconds, such as will characterize the A-SYNCH sequence, but which does not require the perfect reception or complete transmission of the A-SYNCH signal.

After detection of the requisite two edges of the second A-SYNCH sequence, and both terminals then will conduct all subsequent communications in the enhanced TDD protocol. If this simple handshake is used, there should be at least about a 20 millisecond pause between the characters, or a pause sufficient to permit the telephone lines to settle to avoid erroneous result.

In order that the most rapid communication protocol available be utilized by communicating terminals, each enhanced TDD would be programmed to send the synchronization character at the start of any data communication in a new communication session and pause for a time period sufficient for the communicating station to respond. In other words, the first character which the TDD sends on the line is the synchronization character. Since the entire handshake can be accomplished, if only two synchronization characters are used, in less than 250 milliseconds, the process will be largely transparent to the users. Nevertheless, in that time period, the two machines would recognize that each is capable of enhanced TDD communication and further communication would be conducted using that protocol, with its accompanying advantages to the communicating persons.

Other variations on the handshake are also possible. It may be necessary, on occasion, to have each station transmit two synchronization sequences to the other to verify enhanced TDD protocol capability prior to switching to enhanced TDD communication. The sending station and receiving station could take turns sending each other synchronization sequences, until each have sent two characters, before switching to enhanced Baudot protocols. Another alternative which is possible is for the enhanced TDD terminal to send characters in conventional Baudot which will not be displayed by the receiving terminal, but which would be coded to indicate enhanced TDD capability. For example, if the transmitting station sent two "FIG" or two "LTR" characters, which normally would not follow each other in conventional Baudot communication, such a pattern can be used as a code for enhanced TDD signaling, particularly if followed by a synchronization pattern such as that described above.

Regardless of which handshake protocol is utilized, the enhanced TDD terminal must be capable both of detecting the synchronization character when received or, alternatively, detecting a conventional 45.5 baud character indicative of conventional TDD protocol capability when received. If the enhanced TDD sends a synchronization pulse, or whatever other pattern is utilized to indicate the capability of enhanced TDD communication, and no appropriate return handshake is received, the enhanced TDD terminal must be capable of conducting further communication under conventional Baudot/Weitbrecht protocols. These capabilities are all made possible by proper software coding of the microprocessor 14 of the TDD in FIG. 1. In essence, the timing of the data inputs and outputs can be entirely under control of the software, and hence by reprogramming the microprocessor, it is possible to alter the timing sequence to result in these functions as described herein.

Once the functionality of a device is described as is done herein, the coding of the microcode to operate the microprocessor is well within the skill of those of ordinary skill in the art of modern electronic design.

Note that the enhanced TDD protocol described herein makes use of the larger 7-bit character set. Unlike the smaller 60-character Baudot character set, the seven-bit ASCII and CCITT character sets of 128 characters includes both upper and lower case letters and, in addition, includes a full set of punctuation and the ability to include control characters. This raises the possibilities that TDDs could be designated to operate with control codes not presently available in conventional Baudot communication. Such control codes might indicate the type of device and might be utilized to turn features of the devices on or off, for example the display, depending on particular needs of the moment. One terminal can now change the functioning of the other terminal, a capability which is new to the text telephone, or TDD, environment. Note that, unlike ASCII communication protocols, the tone signals utilized within the enhanced TDD protocol of the present invention are conventional Baudot. The tones are also presented on the telephone line only when characters are being transmitted. No carrier tones are maintained when neither station is transmitting. This is a very desirable feature of any TDD communication protocol. Just as hearing and speaking telephone users are occasionally put on "hold," so TDD users are sometimes put on hold. Placing one station of a communication link operating under ASCII protocols (i.e. Bell 212A or the like) on hold terminates the communication link, by breaking the carrier. This is not true either in standard Baudot or enhanced TDD protocol described herein. Since the ability to put someone on hold is a useful part of conventional telephone communications, the fact that a hold capability is inherent in this enhanced TDD protocol is significant.

In the operation of the TDD in accordance with the present invention, further constraints are implemented in the enhanced protocol TDD which are intended to permit pseudo-duplex communication. This is done by implementing the two simple rules of pseudo-duplex communication referred to above. The microprocessor is programmed to accept data from the keyboard asynchronously and, if data is being received over the telecommunication line, to not transmit the data immediately but to store the characters typed in the buffer of the RAM 24. Meanwhile, if data is being received, it is displayed on the visual display for reading by the user. Meanwhile, the user can continue to type characters, and characters will be received by the device and placed into RAM for transmission in turn to the remote station. Techniques for buffering such communication lines by buffering both input and output data are techniques well known to those of ordinary skill in the art.

In conventional Baudot communications, TDDs are incapable of receiving data when a character transmission is occurring. Therefore, it has become a convention for users of TDDs to yield the floor at the end of each data transmission. Often they yield the floor by typing the letters "ga," as an abbreviation for "go ahead," at the end of a text string transmission. The enhanced TDD obviates the necessity for any kind of indication at the end of a character string. Since both users may type asynchronously without losing data, it is not required, except for etiquette, for each user to indicate to the other that it is the other's turn to proceed.

Again, consider the first of the two rules for operating pseudo-duplex TDDs. Under that rule, each station must be constrained not to make any transmissions outward on its communication line while it is receiving data. During that time period, keyboard characters from the user are stored in the buffer. The terminal will wait until there is a pause on the communication line and then transmit characters from its buffer in turn.

The second rule of pseudo-duplex communication requires that each station pause after a certain N number of characters have been transmitted. The number of characters N is between 1 and 72, and preferably between 1 and 20. Let us assume, for the purposes of illustration, that the number of characters to be transmitted before a pause is twenty. At the end of twenty characters, the local enhanced TDD device will pause. If the remote terminal at the other end of the communication line is also an enhanced TDD device, which has characters in its stack to be transmitted, it will be free during the pause to begin transmission of characters in return. The transmission of characters from the remote TDD will cause the local enhanced TDD to not transmit during the time of reception of data. At the end of the transmission of the twenty characters, the remote TDD will also pause. This pause will allow the local station TDD to again resume control of the communication line, and transmit its packet of twenty characters to the remote terminal. In this way, the two TDDs alternate in the transmission of packets of characters back and forth. In view of the fact that the communication protocol allows the transmission of in excess of eleven characters per second, the communication will still be perceived by the users as fast as or faster than normal Baudot communications, even if both users are occasionally typing at exactly the same time. Also, characters will rarely be lost by simultaneous typing by the two users, since each station is buffering its output and transmitting only when it is not receiving.

The time period for such a pause between character sets can be brief. Clearly, the longer the pause and the more often the pause is inserted between characters, the slower the overall rate of communications will be. The pause may be as short as two average bit times (20 milliseconds) or as long as 100 milliseconds, depending upon needs. If the enhanced TDD is being used for overseas communication via satellite linkage, an initial pause time as long as 900 milliseconds may be required to allow for the delay in the satellite linkage. It has been found that a pause of 155 milliseconds to check for possible interrupts is sufficiently long for most applications and is not intrusive to the user. In any event, a first portion of the pause period (perhaps 15 milliseconds) is appropriate simply to let the transients on the telephone line to settle and for echoes to cease, following the tones from the transmitting station being transmitted. Thereafter, the transmitting station would sense for data transmission from the previously receiving station. If no data transmission is received, the station can go back and send another set of characters, whereas if data is received from the remote station, transmission would temporarily cease.

An intermediate application of this feature allows the remote terminal to press a single capital "I" to indicate a desire to interrupt. During the next pause, the remote station sends the character and the local station receives it. The local station is programmed that, when it receives that single character, that it is to display the word "INTERRUPT" to its user. In this way, for the first time in the TDD environment, users can signal their desire to communicate without corrupting transmission.

If data is both being received and transmitted by the enhanced TDD device, it is helpful that both sets of data be displayed for the user. TDDs can have a single or multiple line display for the user. In order for both transmitting and receiving data to be displayed, the display must be split into two portions. The split can be along a vertical or a horizontal axis. If the display is two lines or larger, one line can be used for transmitting data while another is used for received data. In any event, the presentation of characters to the display is always done under software control, and hence it is a relatively simple matter for the microprocessor to split sections of the memory and separately update the two sections based on the data received, so that the display continually scrolls the two characters strings, one for the data typed by the user and one for the information being received from the remote station.

It is an advantage of the method of operating TDDs as described herein that it can be implemented and retrofitted to existing TDDs solely by software upgrade. As can be seen in FIG. 1, the hardware portions of the internal components of a conventional TDD are quite capable of handling the needs of the enhanced TDD protocol described herein. The hardware portions of the circuits of FIG. 1 have little to do with the actual timing of the data input and output. The timing details of the transmission of data and the translation and recognition of the codes of the data, are all handled under software control by the program for the microprocessor contained in the ROM 22. In fact, even conventional TDDs often include 7-bit character table in their memory, in order to recognize characters from ASCII keyboards and present characters to ASCII displays or printers. Hence, no new additional data tables even need to be added to the program in many TDDs to gain the abilities of the enhanced TDD protocol. What does need to be altered in the program is simply the timing and flow of transmitted data, as well as constraining the transmission of data to obey the rules for pseudo-duplex communication described above. In addition, the program must efficiently and tolerantly test for the presence of the synchronization characters at all times, even in the middle of communicating in conventional 45.5 baud communication. This is so that if the synchronization character is received, the enhanced TDD device can respond appropriately, so that further communication can be conducted in the enhanced TDD protocol.

It is understood that the enhanced TDD protocol described here may also be implemented in other TDD-compatible devices intended to communicate with the TDD network of users. Such devices include relay equipment, bulletin boards, news-services, and other automated TDD communication devices with other than human (i.e. keyboard) inputs.

It is understood that the present invention is not limited to the particular embodiments illustrated herein, but embraces such modified forms thereof as come within the scope of the following claims.

We claim:

1. An enhanced telecommunication device for the deaf (TDD) for communication over a telephone line, the device comprising a source for input data characters to be transmitted;

a destination for received data characters;

a microprocessor operating in accordance with a stored program code and connected to accept input data from the input source and to deliver data characters to the destination;

an analog input line adapted to being connected to the telephone line so as to be responsive to the reception of Baudot tones over the telephone line and also connected to the microprocessor so as to provide a digital input to the microprocessor of the data received over the telephone line;

an analog output circuit adapted to being connected to the telephone line so as to be capable of presenting Baudot tones over the telephone line and also connected to receive data from the microprocessor and transmit Baudot tones encoding such data over the telephone line; and a memory device connected to the microprocessor containing the program code for operation of the microprocessor to control operation of the telecommunications device to generally
   (i) receive data entered from the input source,
   (ii) present data entered from the input source on the analog output line,
   (iii) receive data from the analog input line and
   (iv) deliver data from the analog input line to the destination; the program code further comprising code
      (a) enabling communication under either a conventional Baudot protocol, which uses Baudot tones for sending data, which does not transmit a carrier on the telephone line when no data is being sent, and which transmits data at either 45.5 or 50 characters per second, or an enhanced TDD protocol which uses Baudot tones or sending data, which does not transmit a carrier on the telephone line when no data is being sent, and which operates at a data transmission rate in excess of 100 baud,
      (b) causing a special synchronization sequence to be transmitted under the enhanced TDD protocol, the synchronization sequence being composed of one of the Baudot tones and an echo suppression tone, the synchronization sequence selected to not be recognized as a displayed character by a remote telecommunication device operating under conventional Baudot protocol, and
      (c) causing the timing and format of communications to be in conventional Baudot protocol if no Baudot tone sequence is received in return from the remote telecommunication device indicating the capability to communicate in the enhanced TDD protocol and causing the timing and format of communication to be in the enhanced TDD protocol if a Baudot tone sequence is received in return from the remote telecommunication device indicating the capability to communicate in the enhanced TDD protocol.

2. A telecommunication device for the deaf as claimed in claim 1 wherein the enhanced TDD protocol includes mark bits and space bits of differing bit time intervals.

3. A telecommunication device for the deaf as claimed in claim 1 wherein the enhanced TDD protocol includes a seven-bit character and the character table from ASCII code.

4. A telecommunication device for the deaf as claimed in claim 1 wherein the enhanced TDD protocol synchronization sequence is a sequence of alternating mark tones which are 1400 Hertz and echo suppression tones which are neither 1800 nor 1400 Hertz.

5. A telecommunication device for the deaf as claimed in claim 4 wherein the enhanced TDD protocol synchronization sequence is a sequence of alternating mark tones which are 1400 Hertz and echo suppression tones which are neither 1800 nor 1400 Hertz, beginning with an echo suppression tone and alternating between echo suppression tones and mark tones until five mark tones have been transmitted.

6. A telecommunication device for the deaf as claimed in claim 1 wherein the program code further constrains the device to impose a pause after the synchronization sequence before the start of initial data transmissions to sense for receipt of a synchronization sequence from a remote device.

7. A telecommunication device for the deaf as claimed in claim 1 wherein the input source is a keyboard.

8. A telecommunication device for the deaf as claimed in claim 1 wherein the destination is a visually readable display.

9. An enhanced telecommunication device for the deaf (TDD) for communication over a telephone line, the device comprising a source for input data characters to be transmitted;

a destination for received data characters;

a microprocessor operating in accordance with a stored program code and connected to accept input data from the input source and to deliver data characters to the destination;

an analog input line adapted to being connected to the telephone line so as to be responsive to the reception of Baudot tones over the telephone line and also connected to the microprocessor so as to provide a digital input to the microprocessor of the data received over the telephone line;

an analog output circuit adapted to being connected to the telephone line so as to be capable of presenting Baudot tones over the telephone line and also connected to receive data from the microprocessor and transmit Baudot tones encoding such data over the telephone line; and a memory device connected to the microprocessor containing the program code for operation of the microprocessor to control operation of the telecommunications device to generally
 (i) receive data entered from the input source,
 (ii) present data entered from the input source on the analog output line,
 (iii) receive data from the analog input line and
 (iv) deliver data from the analog input line to the destination; the program code further comprising code
  (a) enabling communications under either a conventional Baudot protocol or an enhanced TDD protocol which transmits data using Baudot tones without transmitting a carrier when no data is being sent, the data being transmitted at a data transmission rate which exceeds an average rate of 100 baud and which includes mark bits and space bits of different bit time intervals,
  (b) causing a special synchronization sequence to be transmitted under the enhanced TDD protocol, which sequence is made up of 1400 hertz tones and echo suppression tones, the sequence selected to be a sequence which is not recognized as a displayed character by a remote telecommunications device operating under conventional Baudot protocol, and
  (c) causing the timing and format of communications to be in conventional Baudot protocol if no synchronization sequence is received in return from the remote telecommunications device and in enhanced TDD protocol if a synchronization sequence is received in return from the remote telecommunications device.

10. A telecommunication device for the deaf (TDD) comprising a keyboard;

a visually readable display;

a microprocessor operating in accordance with a stored program code and connected to accept input data characters from the keyboard and to present data characters on the display;

an analog input circuit adapted to being connected to a telephone line so as to be responsive to the reception of Baudot tones over the telephone line and also connected to the microprocessor so as to provide a digital input to the microprocessor of the data received over the telephone line;

an analog output line adapted to being connected to the telephone line so as to be capable of presenting Baudot tones over the telephone line and also connected to receive data from the microprocessor and transmit Baudot tones encoding such data over the telephone line; and a memory device connected to the microprocessor containing the program code for operation of the microprocessor to control operation of the telecommunications device to generally
 (i) receive data entered from the keyboard,
 (ii) present entered data from the keyboard on the analog output line,
 (iii) receive input data from the input analog line and
 (iv) display data from both the keyboard and the input analog line on the display;

the program code further comprising code enabling communication under either a conventional Baudot protocol or an enhanced TDD protocol, the enhanced TDD protocol using a seven-bit character set, using the Baudot tones of 1400 Hertz for a logical one and 1800 Hertz for a logical zero, and having a bit time for a space of 12 milliseconds and a bit time for a mark of 7 milliseconds.

11. A method of using a telecommunication device for sending characters received from a user over a telephone line to a recipient telecommunications device comprising the steps of accepting a series of input characters from the user, storing the series of characters in the form of digital data in memory in the telecommunications device, transmitting the series of characters over a telephone line as a sequence of tones encoded in an enhanced TDD protocol in which (i) Baudot tones of 1400 and 1800 hertz are used to represent data bits when data is being sent with no tones being transmitted when no characters are being sent, (ii) the bit times for a logical space bit and for a logical mark bit are different in time so as to minimize the total time required for character transmission, (iii) each character is represented by seven bits, (iv) the characters are encoded using an ASCII character set, and (v) the average rate of character transmission is in excess of 100 baud, and receiving sequence of tones at the recipient telecommunications device and decoding the series of characters therefrom.

12. A telecommunication device comprising a keyboard for accepting a series of input characters from a user, a display for displaying the characters which are input by the user, a microprocessor connected to the keyboard and the display for receiving and displaying the series of characters, a memory connected to the microprocessor for storing the series of characters and for storing program code for operation of microprocessor to control operation of the telecommunications device, an analog output circuit connected to the microprocessor and adapted for linkage to a telephone line, the analog output circuit capable of generating Baudot tones of 1400 and 1800 hertz, and the program code causing the microprocessor to direct the analog output circuit to transmit the series of characters onto the telephone line in an enhanced TDD protocol in which (i) Baudot tones of 1400 and 1800 hertz are used to represent data bits with no tones being transmitted when no characters are being sent, (ii) the bit times for a logical space bit and for a logical mark bit are different in time so as to minimize the total time required for character transmission, (iii) each character is represented by seven bits, (iv) the characters are encoded using an ASCII character set, and (v) the average rate of character transmission is in excess of 100 baud.

\* \* \* \* \*